(12) United States Patent
Liu et al.

(10) Patent No.: US 7,555,758 B2
(45) Date of Patent: Jun. 30, 2009

(54) TRANSPORTATION DEVICE AND COMPACT DISC PROCESSING SYSTEM USING THE SAME

(75) Inventors: Ming-Hsun Liu, 10F-6, No. 79, Hsin-Tai-Wu Road, Section 1, Hsi-Chih 22147 (TW); Chung-Hsuan Tsai, Hsi-Chih (TW)

(73) Assignee: Ming-Hsun Liu, Hsi-Chih (TW)

( * ) Notice: Subject to any disclaimer, the term of this patent is extended or adjusted under 35 U.S.C. 154(b) by 552 days.

(21) Appl. No.: 11/306,009

(22) Filed: Dec. 14, 2005

(65) Prior Publication Data
US 2006/0209642 A1  Sep. 21, 2006

Related U.S. Application Data

(63) Continuation-in-part of application No. 11/068,961, filed on Mar. 2, 2005, now abandoned.

(30) Foreign Application Priority Data

Mar. 3, 2004  (TW) ............................. 93106020 A (51) Int. Cl.
*G11B 17/04* (2006.01)
*G11B 21/08* (2006.01)
*G11B 7/085* (2006.01)
(52) U.S. Cl. .................. 720/623; 369/30.55; 369/30.57
(58) Field of Classification Search ................ 369/30.2, 369/30.31, 30.43, 30.45, 30.51, 30.55, 30.57, 369/30.61, 30.76, 30.77, 30.78, 30.85, 30.87, 369/30.94, 30.95, 30.96, 30.97, 178.01, 179, 369/191.1, 192.1, 196, 202, 206; 720/623
See application file for complete search history.

(56) References Cited

U.S. PATENT DOCUMENTS

| | | | |
|---|---|---|---|
| 5,319,621 A | 6/1994 | Amar | |
| 5,481,514 A | 1/1996 | Yamasaki et al. | ............. 369/36 |
| 5,808,828 A | 9/1998 | Forrer et al. | |
| 5,914,918 A | 6/1999 | Lee et al. | |
| 5,940,355 A | 8/1999 | Buckland et al. | |
| 5,946,216 A * | 8/1999 | Hollerich | ..................... 700/223 |
| 5,959,958 A * | 9/1999 | Inatani et al. | ............ 369/30.85 |
| 6,111,847 A * | 8/2000 | Assadian | ................. 369/30.55 |
| 6,141,298 A | 10/2000 | Miller | ......................... 369/30 |
| 6,147,960 A | 11/2000 | Wolfer et al. | |
| 6,321,649 B1 * | 11/2001 | Vangen et al. | ................. 101/35 |

(Continued)

*Primary Examiner*—Brian E Miller
*Assistant Examiner*—Adam B Dravininkas
(74) *Attorney, Agent, or Firm*—Alan Kamrath; Kamrath & Associates PA (57) ABSTRACT

A transportation device for moving a compact disc includes a moving arm, a screw bolt, and a guide track device. The moving arm has a first end, and the first end has a protrusive section located on a peripheral surface thereof. The screw bolt is screwed through the first end of the moving arm so that the moving arm can be moved when the screw bolt is rotating. The guide track device is composed of a plurality of crossed slots. The protrusive section of the first end of the moving arm can be slidably connected to the slots of the guide track device when the screw bolt is rotating, whereby the moving arm can be directed in different directions by the slots of the guide track device.

20 Claims, 8 Drawing Sheets

U.S. PATENT DOCUMENTS

| | | | |
|---|---|---|---|
| 6,490,232 B2 * | 12/2002 | Sato | 369/30.34 |
| 6,802,070 B2 * | 10/2004 | Britz et al. | 720/619 |
| 7,061,515 B2 | 6/2006 | Cummins et al. | |
| 7,092,320 B1 * | 8/2006 | Lee et al. | 369/30.32 |
| 7,360,812 B2 * | 4/2008 | Ionescu | 294/27.1 |
| 2001/0022766 A1 | 9/2001 | Nakanishi et al. | |
| 2003/0002400 A1 * | 1/2003 | Klein | 369/30.55 |
| 2005/0022221 A1 | 1/2005 | Inatani et al. | |
| 2005/0195701 A1 * | 9/2005 | Liu et al. | 369/30.34 |

* cited by examiner

FIG. 6C

TRANSPORTATION DEVICE AND COMPACT DISC PROCESSING SYSTEM USING THE SAME

CROSS-REFERENCE

This application is a continuation-in-part (CIP) of application Ser. No. 11/068,961, filed on Mar. 2, 2005. The prior application is herewith incorporated by reference in its entirety.

BACKGROUND OF THE INVENTION

1. Field of the Invention

The present invention relates to a transportation device and, more particularly, to a transportation device for compact discs. In addition, this invention also relates to a compact disc processing system using the transportation device.

2. Description of the Related Art

A conventional transportation device usually requires more than two power units (such as motors) to move an arm for gripping a compact disc in different directions (such as up/down and left/right). So, it may have problems on cost and space.

All optical compact discs can be reproduced for a small amount or a reasonable amount by a reproduction system, such as the system claimed in U.S. Pat. No. 6,141,298. However, this system requires an enormous amount of space, which is very inconvenient in terms of transportation and operation. Furthermore, due to its complex structure, it also imposes high manufacturing cost.

U.S. Pat. No. 6,490,232 discloses a compact disc feeder utilizing a transfer device 6 to drive an arm 12 to move and rotate to take a disc from a holder 5 and place it into a tray 49 of a printer 48. Then, the compact disc, which has been printed, is drawn from the printer 48 and stacked in a lower holder 5. However, this device still requires large amounts of space.

U.S. Pat. No. 5,481,514 discloses a recording/reproducing apparatus for a disc-like recording medium, which can move between two abreast tray stockers 104, 105 and move the tray stocker 104 to a reproduction unit 206 and, then, back to the tray stocker 105. The two abreast tray stockers 104, 105 still require large amounts of space.

Therefore, it is desirable to provide a compact disc processing system and a transportation method for compact discs to mitigate and/or obviate the aforementioned problems.

SUMMARY OF THE INVENTION

A main objective of the present invention is to provide a transportation device for a compact disc (CD), which provides a simple structure to reduce the manufacturing cost.

Another objective of the present invention is to provide a CD processing system, such as a CD reproduction system, duplication system, printing system, coating system or laminating system, which can utilize the head space in the compact disc processing device for storing compact discs to solve problems associated with space.

A transportation device for moving a CD according to the present invention comprises a moving arm, a screw bolt, and a guide track device. The moving arm has a first end, and the first end has a protrusive section located on a peripheral surface thereof.

The screw bolt is screwed through the first end of the moving arm so that the moving arm can be moved up and down spirally when the screw bolt is rotating. The guide track device of this invention is composed of at least one crossed slot for the protrusive section of the first end of the moving arm to be slidably connected to. Thus, the moving arm can be directed in different directions by the at least one slot of the guide track device. The at least one slot of the guide track device can guide the moving arm in a certain direction by the connection of the protrusive section.

The moving arm further has a second end, and the second end is used to engage with at least a gripper for gripping the CD. Each gripper comprises a hook and a stopping block. The hook has a V-sharped edge used for holding the CD. The stopping block is capable of touching the gripped CD.

Furthermore, this invention discloses a CD processing system comprising a processing device, a first compact disc receptacle, and a transportation device. The first compact disc receptacle is disposed adjacent to the processing device. The transportation device can be utilized for moving a CD between the processing device and the first compact disc receptacle, wherein the transportation device comprises, as above, a moving arm, a screw bolt, and a guide track device.

The CD processing system further comprises a second CD receptacle, wherein the processing device has a top section for placing the second CD receptacle. The transportation device is capable of moving the CD between the first compact disc receptacle and the second compact disc receptacle or between the processing device and the second compact disc receptacle.

In addition, this invention discloses a compact disc processing system comprising a processing device and a transportation device. The processing device has a plurality of trays so that the transportation device can be used to move a CD between the trays of the processing device, wherein the transportation device comprises, as above, a moving arm, a screw bolt, and a guide track device.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
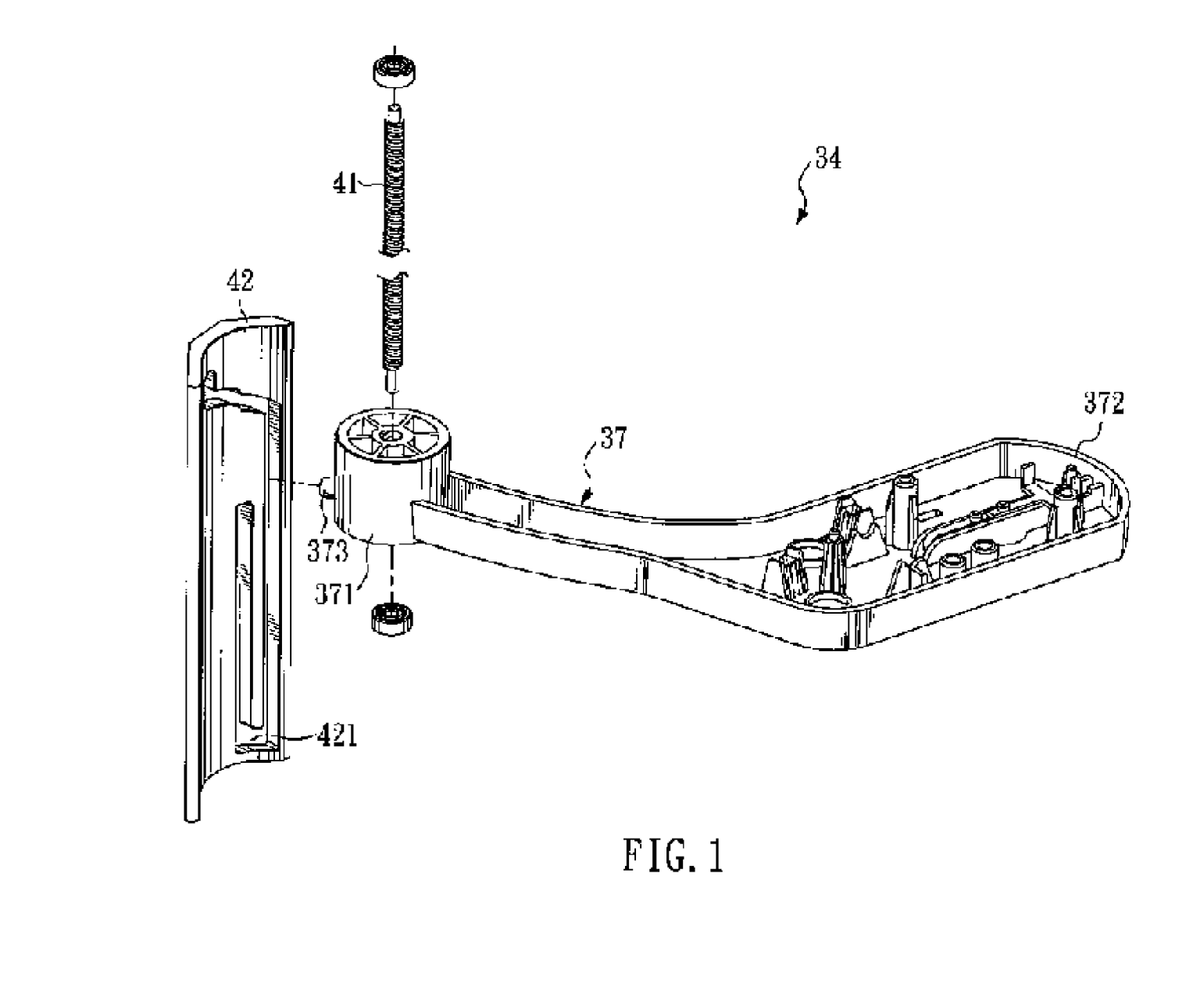
FIG. 1 is an exploded, perspective view of a transportation device according to the present invention.
Figure 6A:
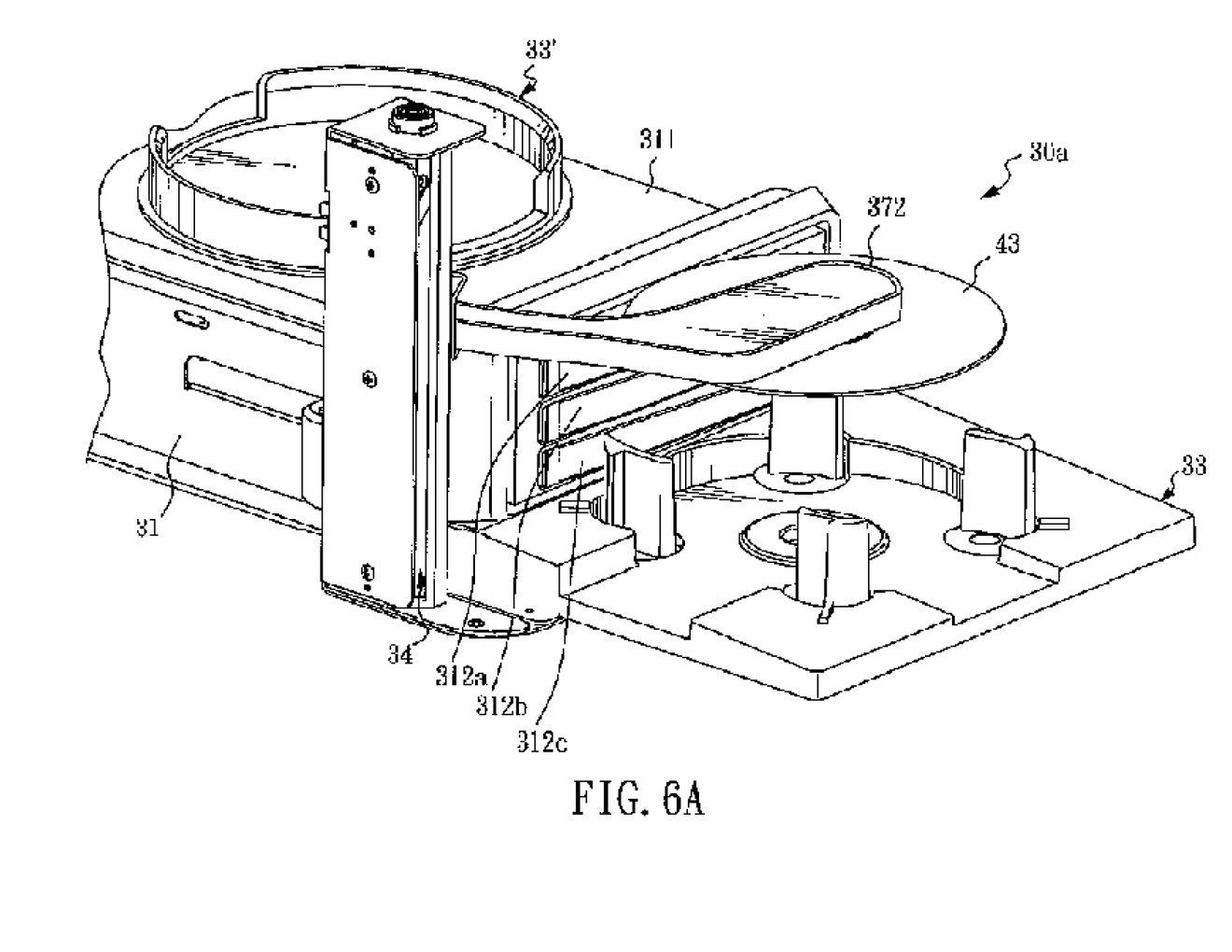
FIG. 6A-6C are perspective views of different embodiments of a CD processing system according to the present invention.
Figure 6B:
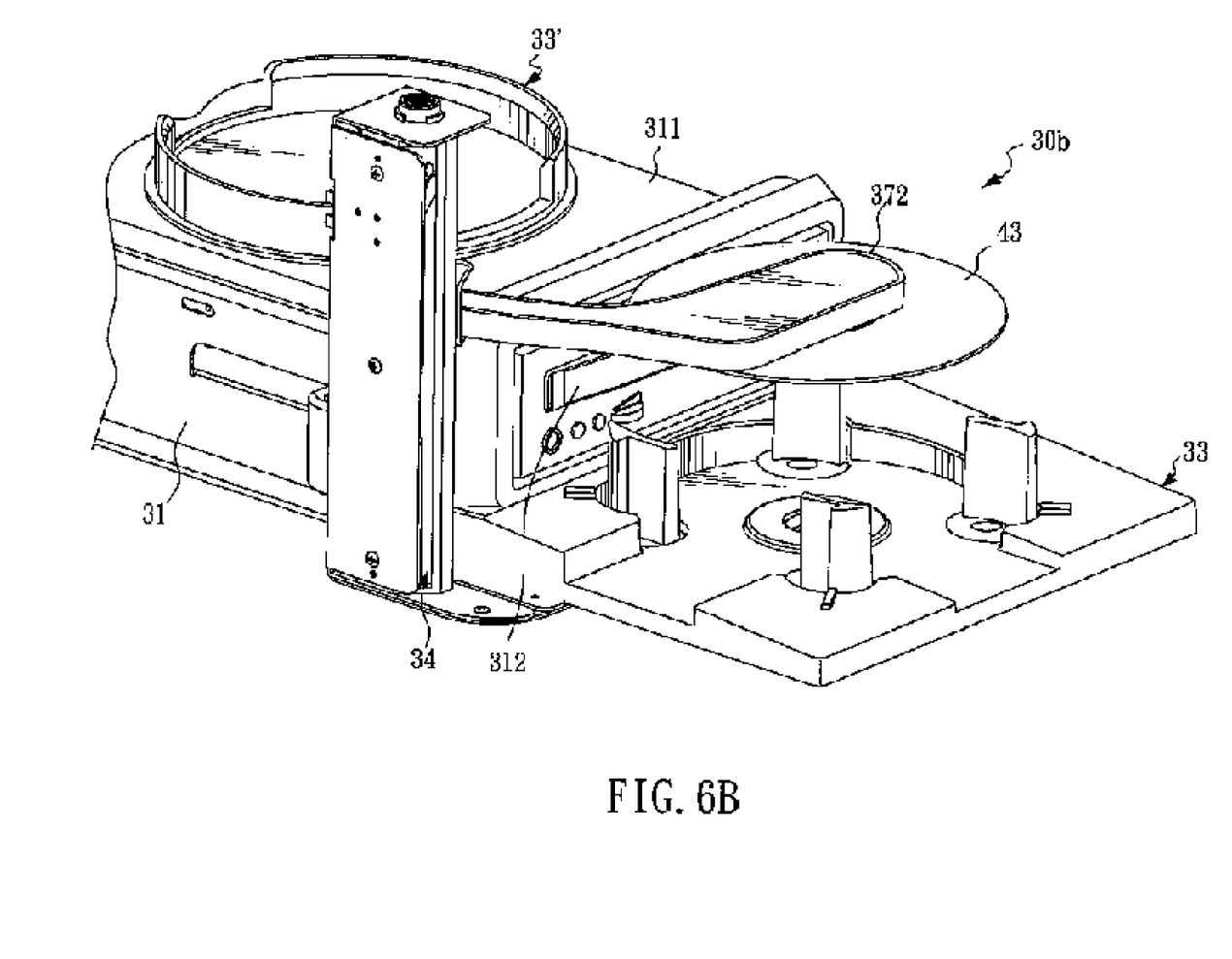
Figure 6C:
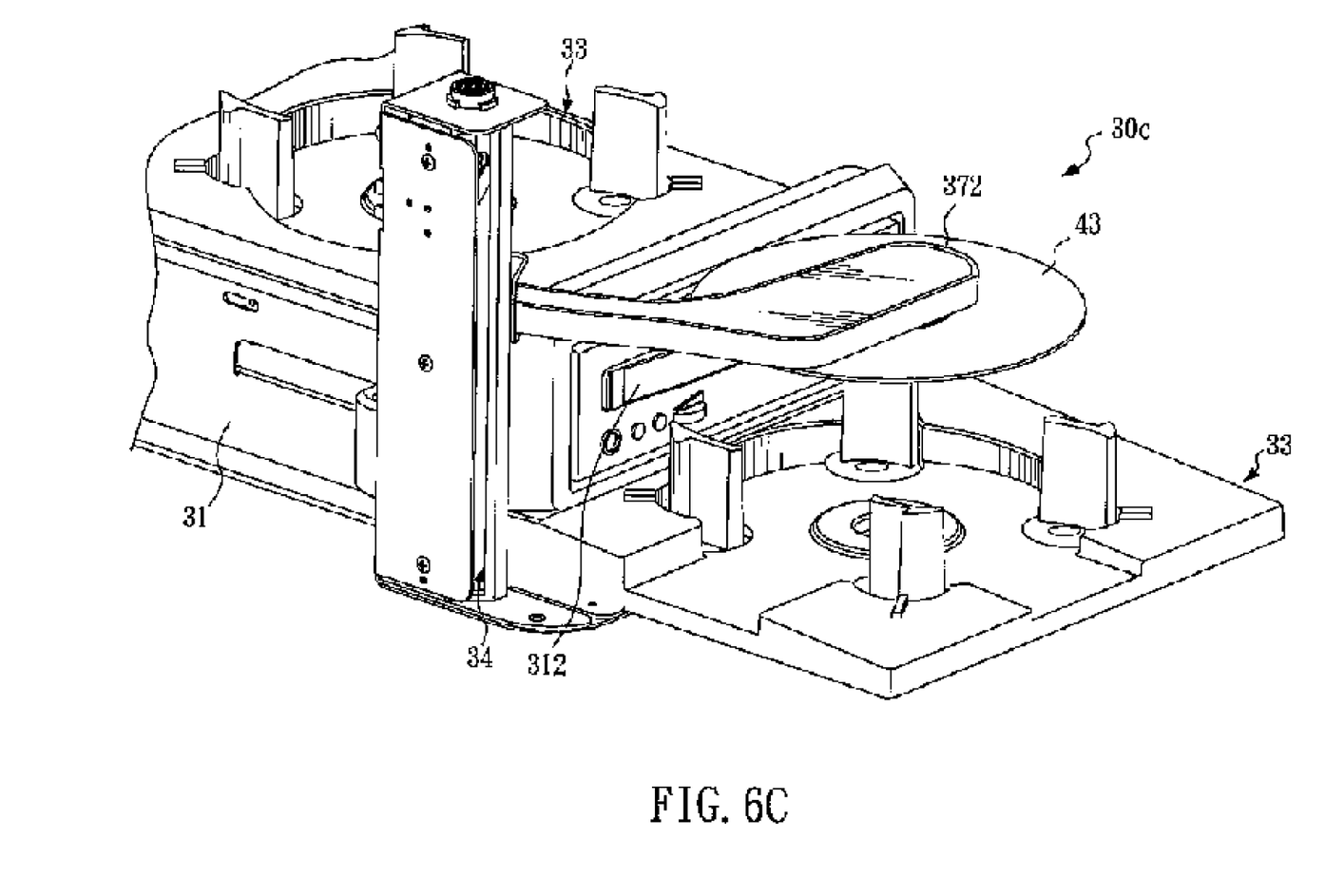

Please refer to FIG. 1, which shows an exploded view of a transportation device 34 according to the present invention. The transportation device 34 is used for moving a compact disc (CD) 43, as shown in FIGS. 6A, 6B, or 6C.

Figure 2:
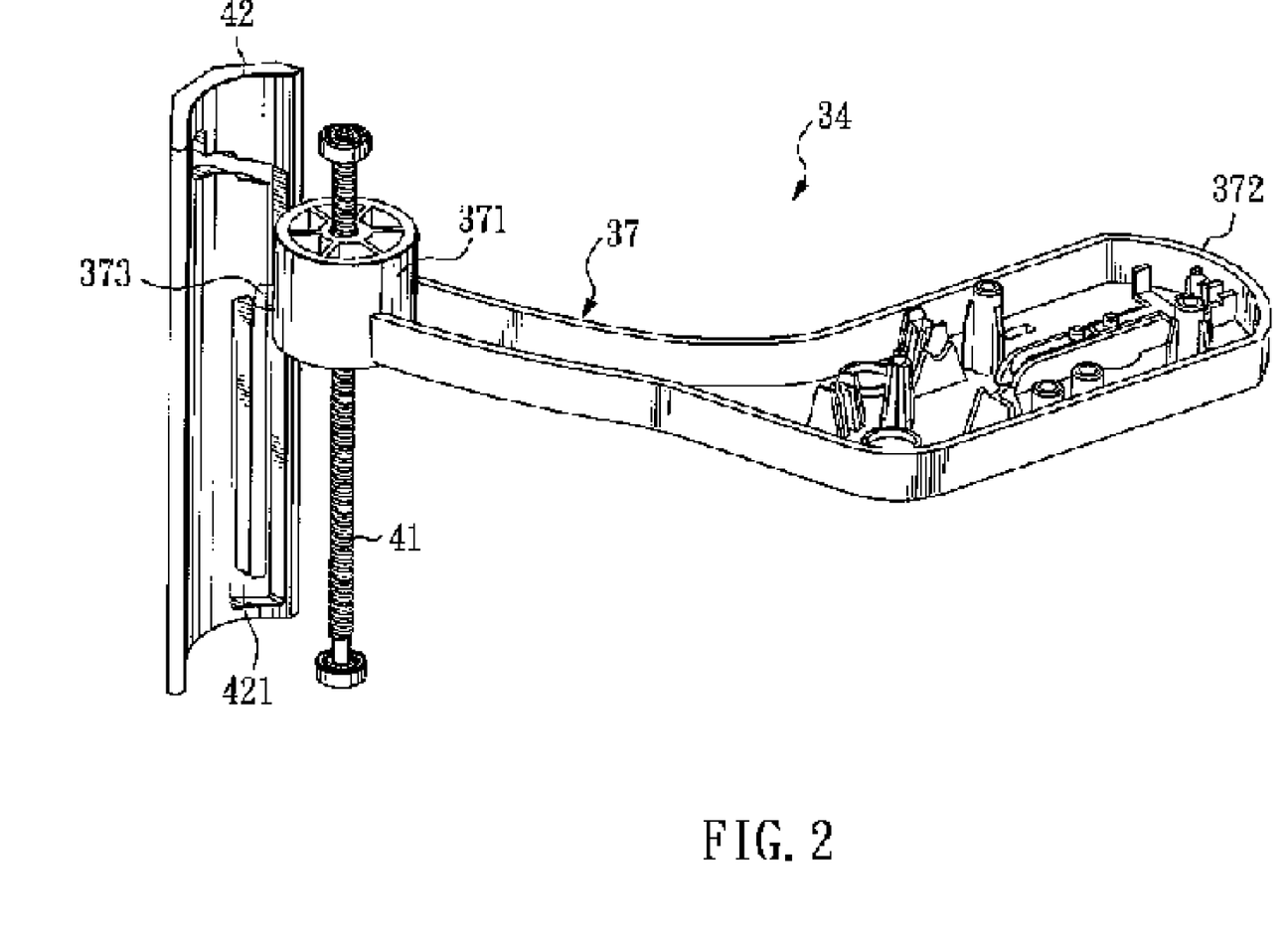
FIG. 2 shows a perspective view of the transportation device according to FIG. 1.

Please refer to FIG. 1 and FIG. 2. The transportation device 34 comprises a moving arm 37, a screw bolt 41, and a guide track device 42. The moving arm 37 has a first end 371. The guide track device 42 is composed of at least one slot, such as a plurality of crossed slots 421. The first end 371 has a protrusive section 373 located on a peripheral surface of the first end 371. The screw bolt 41 is screwed through the first end 371 of the moving arm 37 so that the moving arm 37 can be moved up/down spirally when the screw bolt 41 is rotating. Traditionally, the screw bolt 41 is driven to rotate by a power unit, such as a motor, which is not shown. When the screw bolt 41 is rotating, the moving arm 37 can be moved up and down spirally according to the engagement between the screw bolt 41 and the moving arm 37.

In addition, the protrusive section 373 of the first end 371 of the moving arm 37 is slidably connected to the slots 421 of the guide track device 42 when the screw bolt 41 is rotating. Thereby, the moving arm 37 can be moved by the screw bolt 41 and guided by the slots 421 in different directions including up, down, left, and right. In other words, when the moving arm 37 is moved spirally, the protrusive section 373 can be guided in the slots in a left and right direction if the slots are horizontal. The protrusive section 373 can be guided in the vertical slots in an up and down direction.

Figure 3:
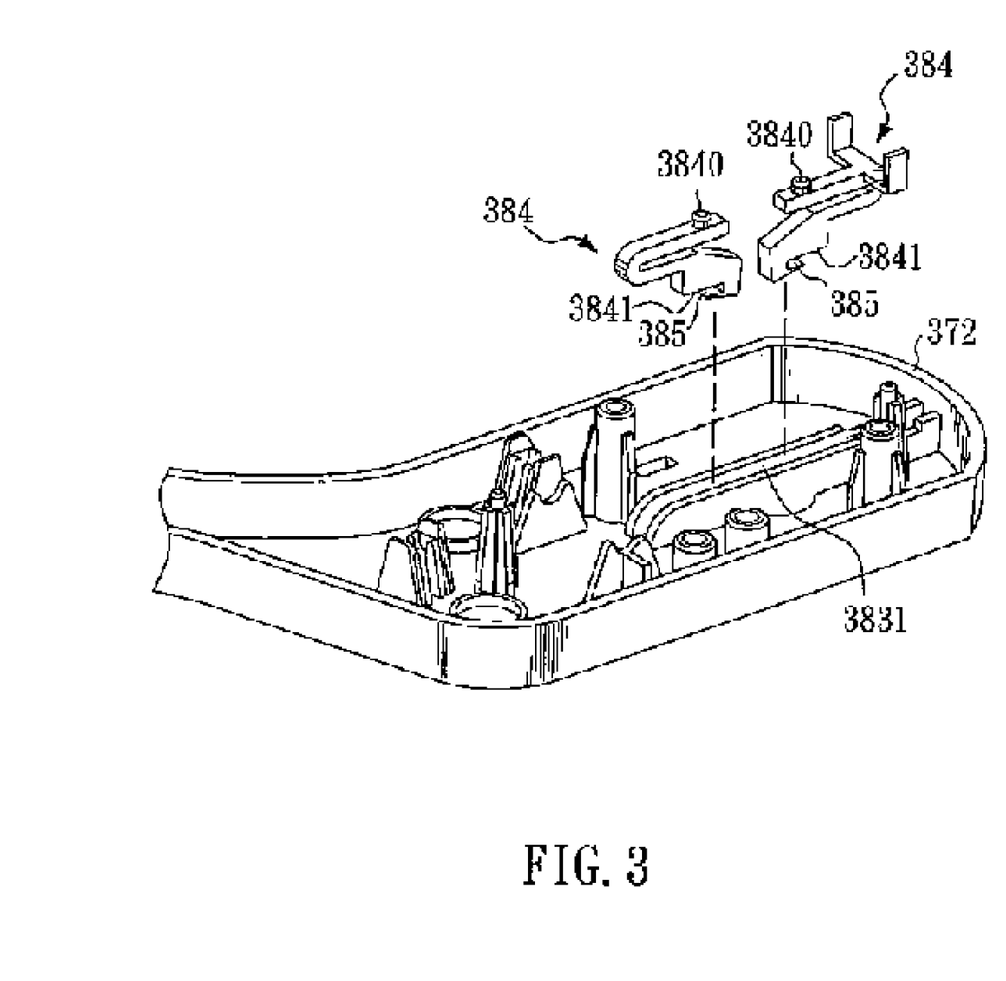
FIG. 3 shows an exploded, perspective view of grippers and an arm of the transportation device according to the present invention.

Furthermore, the moving arm 37 comprises a second end 372. As shown in FIG. 3, the second end 372 engages with at least a gripper 384 for gripping the CD 43. When the transportation device 34 is operating, the grippers 384 are driven by two rollers 3840 connected to a power source (not shown) and are guided by a guide rail 3831 to close or open for gripping the CD 43.

Figure 4A:
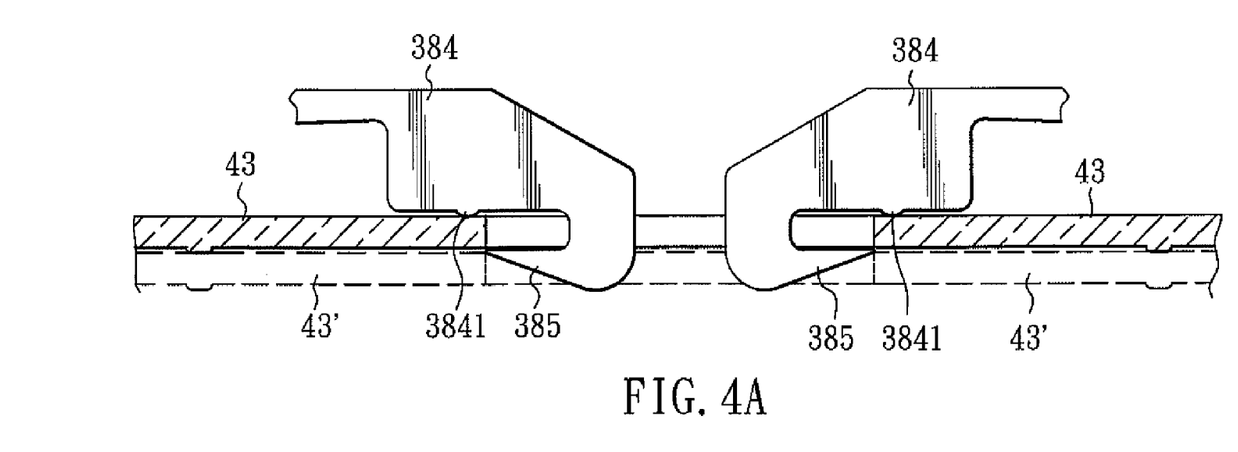
FIGS. 4A-4B are enlarged side views of the grippers and a CD, which shows the grippers gripping the CD.
Figure 4B:
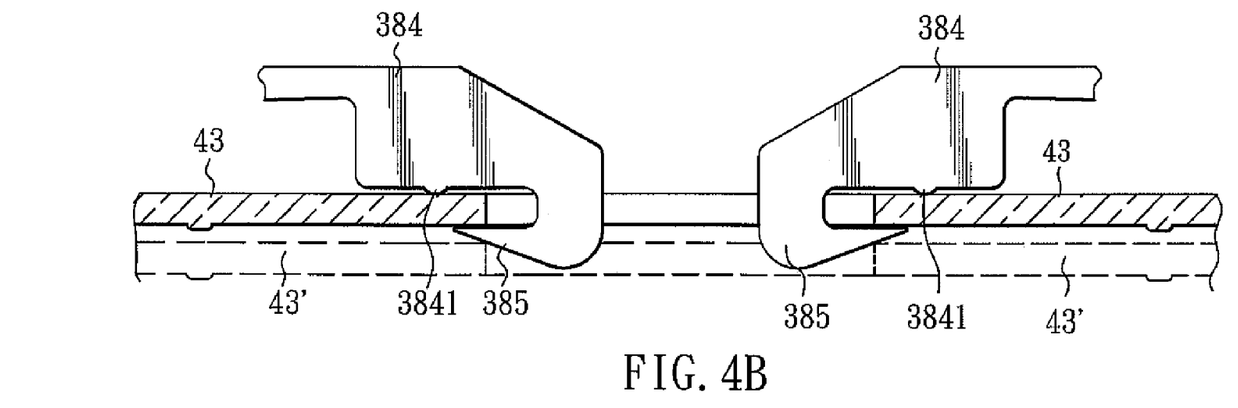

Each gripper 384 comprises a hook 385 for holding the CD 43 and a stopping block 3841 capable of touching the CD 43, as shown in FIG. 4A and FIG. 4B. Preferably, the hook 385 has a V-shaped edge for holding the CD 43 more easily. Please refer to FIG. 4A. Conventionally, there is a very small space between two CDs 43 and 43'. Thus, the V-shaped edge of the hooks 384 can easily hold the CD 43.

Figure 5A:
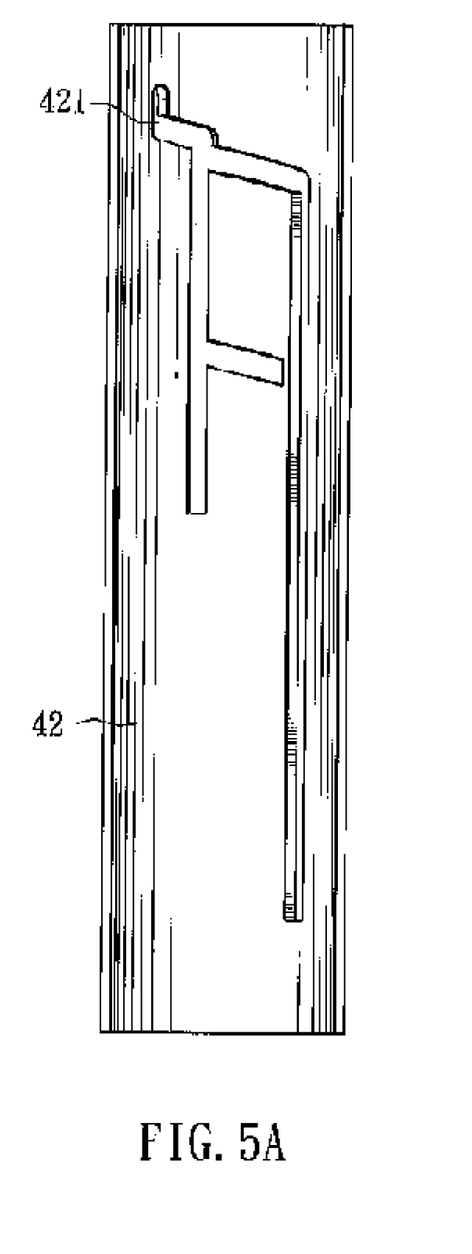
FIG. 5A-5B are side views of a guide track device with different crossed slots.
Figure 5B:
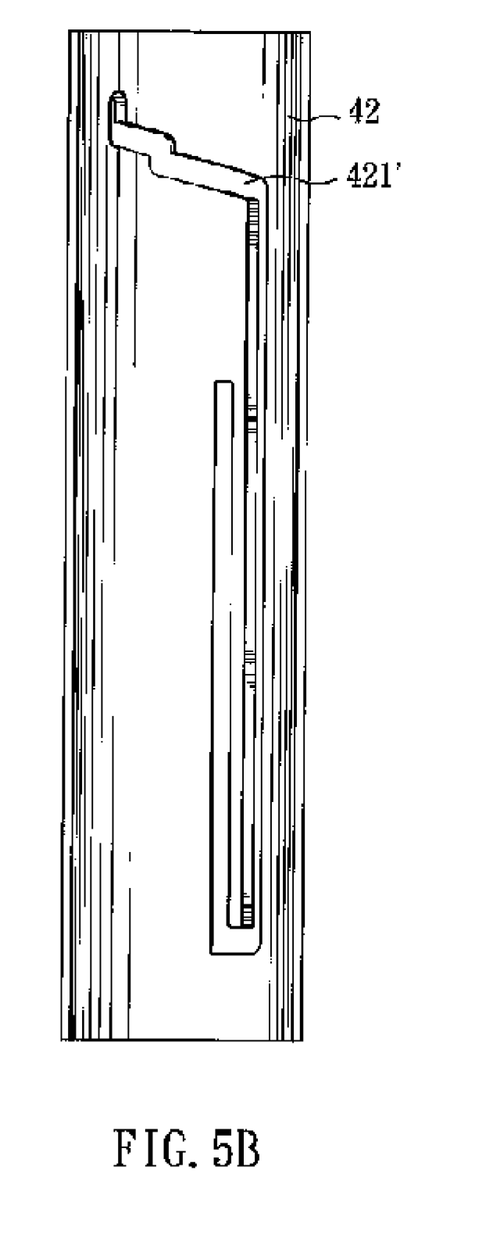

In addition, referring to FIG. 5A and FIG. 5B, the guide track device 42 may have various forms with different crossed slots 421, 421'. That is, when a user utilizes the transportation device 34 of this invention, it may have different guide track device 42 for different moving directions. This is very different from the prior art that must use more than two power units (not shown) to move the CD 43 in a different plane, such as up/down and left/right.

The aforementioned transportation device 34 can be utilized in a CD processing system 30a, 30b, and 30c, as shown in FIGS. 6A, 6B, and 6C. One embodiment of the present invention is the CD processing system 30a, referring to FIG. 6A. The CD processing system 30a comprises a processing device 31 having at least one tray 312a, 312b, 312c and a transportation device 34. The transportation device 34 of the processing system 30a or 30b is same as the above description, as shown in FIG. 1 or FIG. 2.

The processing device 31 comprises a printer, a burner, a recorder, a decoder, a verifier, a reproduction device, or a coating device (not shown), which can be used for a different processing function on the CD, such as printing, recording, burning (writing/rewriting), decoding, verifying, coating, reproducing, or the like.

Referring to FIG. 6A, each tray 312a, 312b, or 312c can move in and out automatically (not shown) for the processing device 31 to process the CD. In another embodiment, one tray 312, as shown in FIG. 6B or FIG. 6C, is enough to achieve a user's demand. Therefore, referring to FIG. 6A, the transportation device 34 can be used to move the CD 43 between different trays 312a, 312b, and 312c. The number of the trays 312a, 312b, 312c can be more or less depending on the user's demand.

In another preferred embodiment, referring to FIG. 6B, the processing system 30b comprises a first CD receptacle 33 for receiving unprocessed or processed CDs. The first CD receptacle 33 is disposed on a top portion 311 of the processing device 31. Thus, the transportation device 34 according to the present invention can be used to move the CD 43 between the first CD receptacle 33 and the tray 312.

In addition, referring to FIG. 6B, the processing system 30b may further comprise a second CD receptacle 33' for receiving unprocessed or processed CDs. Alternatively, as shown in FIG. 6C, the second CD receptacle 33 on the processing device 31 can be substantially the same as the first CD receptacle 33. Therefore, the transportation device 34 according to the present invention can be used for moving the CD 43 among the first CD receptacle 33, the second CD receptacle 33' or 33, and the tray 312 or the trays 312a, 312b, and 312c.

Although the present invention has been explained in relation to its preferred embodiment, it is to be understood that many other possible modifications and variations can be made without departing from the spirit and scope of the invention as hereinafter claimed.

What is claimed is:

1. A transportation device for moving a compact disc comprising:
    a moving arm having a first end and a second end, with the second end transporting the compact disc;
    a protrusive section located on a peripheral surface of the first end;
    a screw bolt screwed through the first end of the moving arm, with the moving arm moving when the screw bolt rotates, with the screw bolt being spaced from and intermediate the protrusive section and the second end; and
    a guide track device comprising interconnecting first and second slots, with the first slot being spaced from and parallel to the screw bolt and with the second slot being spaced from the screw bolt, with the second slot being nonparallel to the screw bolt and the first slot;
    wherein the protrusive section of the first end of the moving arm is slidably connected to the first and second slots of the guide track device when the screw bolt rotates.

2. The transportation device as claimed in claim 1, wherein the first and second slots are a plurality of crossed slots.

3. The transportation device as claimed in claim 1, wherein the second end engages with at least a gripper for gripping the compact disc.

4. The transportation device as claimed in claim 3, wherein each gripper comprises a hook for holding the compact disc.

5. The transportation device as claimed in claim 4, wherein each gripper further comprises a stopping block capable of touching the compact disc.

6. The transportation device as claimed in claim 5, wherein the hook has a V-shaped edge for holding the compact disc.

7. A compact disc processing system comprising:
    a processing device;
    a first compact disc receptacle disposed adjacent to the processing device; and
    a transportation device for moving a compact disc between the processing device and the first compact disc receptacle, wherein the transportation device comprising:
    a moving arm having a first end and a second end, with the second end transporting the compact disc;
    a protrusive section located on a peripheral surface of the first end;
    a screw bolt screwed through the first end of the moving arm, with the moving arm moving when the screw bolt rotates, with the screw bolt being spaced from and intermediate the protrusive section and the second end; and a guide track device comprising interconnecting first and second slots, with the first slot being spaced from and parallel to the screw bolt and with the second slot being spaced from the screw bolt, with the second slot being nonparallel to the screw bolt and the first slot;

wherein the protrusive section of the first end of the moving arm is slidably connected to the first and second slots of the guide track device when the screw bolt rotates.

8. The compact disc processing system as claimed in claim 7, wherein the first and second slots are a plurality of crossed slots.

9. The compact disc processing system as claimed in claim 7, wherein the second end engages with at least a gripper for gripping the compact disc.

10. The compact disc processing system as claimed in claim 9, wherein each gripper comprises a hook for holding the compact disc.

11. The compact disc processing system as claimed in claim 10, wherein each gripper further comprises a stopping block capable of touching the compact disc.

12. The compact disc processing system as claimed in claim 11, wherein the hook has a V-shaped edge for holding the compact disc.

13. The compact disc processing system as claimed in claim 7 further comprising a second compact disc receptacle, wherein the processing device has a top section for placing the second compact disc receptacle.

14. The compact disc processing system as claimed in claim 13, wherein the transportation device moves the compact disc between the first compact disc receptacle and the second compact disc receptacle or between the processing device and the second compact disc receptacle.

15. The compact disc processing system as claimed in claim 7, wherein the processing device comprises a printer, a burner, a recorder, a decoder, a verifier, a reproduction device, or a coating device.

16. A compact disc processing system comprising:
a processing device having at least one tray; and
a transportation device for moving a compact disc between the at least one tray of the processing device, wherein the transportation device comprises:

a moving arm having a first end and a second end, with the second end transporting the compact disc;

a protrusive section located on a peripheral surface of the first end;

a screw bolt screwed through the first end of the moving arm, with the moving arm moving when the screw bolt rotates, with the screw bolt being spaced from and intermediate the protrusive section and the second end; and a guide track device comprising interconnecting first and second slots, with the first slot being spaced from and parallel to the screw bolt and with the second slot being spaced from the screw bolt, with the second slot being nonparallel to the screw bolt and the first slot;

wherein the protrusive section of the first end of the moving arm is slidably connected to the first and second slots of the guide track device when the screw bolt rotates.

17. The compact disc processing system as claimed in claim 16, wherein the second end engages with at least a gripper for gripping the compact disc.

18. The compact disc processing system as claimed in claim 17, wherein each gripper comprises a hook for holding the compact disc, and a stopping block capable of touching the compact disc.

19. The compact disc processing system as claimed in claim 18, wherein the hook has a V-shaped edge for holding the compact disc.

20. The compact disc processing system as claimed in claim 16, wherein the processing device comprises a printer, a burner, a recorder, a decoder, a verifier, a reproduction device, or a coating device.

* * * * *